April 11, 1967   R. D. MATTHEWS   3,313,909
SPOT WELDER ELECTRODE CLEANING DEVICE
Filed July 10, 1964   3 Sheets-Sheet 1

INVENTOR.
ROBERT D. MATTHEWS
BY Francis J. Klempay
ATTORNEY

INVENTOR.
ROBERT D. MATTHEWS
BY
ATTORNEY

United States Patent Office 3,313,909
Patented Apr. 11, 1967

3,313,909
SPOT WELDER ELECTRODE CLEANING DEVICE
Robert D. Matthews, Cortland, Ohio, assignor to The Taylor-Winfield Corporation, Warren, Ohio, a corporation of Ohio
Filed July 10, 1964, Ser. No. 381,864
2 Claims. (Cl. 219—86)

This invention relates to electric resistance welding equipment, and more particularly to a novel arrangement for maintaining the welding electrode tips of production spot welding equipment in optimum condition for the consistent production of high quality welds.

In order to obtain consistent, high quality welds in a repetitively operated spot welding machine, it is generally desirable that the tips of the welding electrodes which engage the work be maintained in a clean, bright condition, free from spelter, and precisely contoured to the best shape determined from experience to be best suited to the work and weld schedule at hand. Not only is this requirement desirable but it is also absolutely necessary when dealing with certain of the newer metals and alloys, such as those known in the trade as Nimonic, Rene 41, Hastelloy X, Inconnel X and Inconnel W. Heretofore, when encountering work requiring the electrodes to be strictly maintained, it has been common practice to stop the welding machine after a predetermined number of spot welds had been made, and replace the electrodes with ones that have been previously cleaned and machined to the correct contour. Depending on the nature of the work, either one or both of the clamping electrodes are required to be so intermittently conditioned. In either case, this procedure is time-consuming and relies upon the operator to exercise diligence in changing the electrode or electrodes after a certain number of spot welds have been made or a certain amount of electrode distortion has taken place.

It is the primary object of the present invention to provide a novel and practical arrangement for securing the spot welding electrode or electrodes in the welding machine and for periodically cleaning and dressing the electrode or electrodes either under manual or automatic control, as desired, whereby the over-all rate of production of the machine may be materially increased particularly when dealing with critical metals, alloys and welding schedules, and whereby a better consistency of high quality welds is achieved. A further object of the invention is the provision of structural arrangements for achieving the above principal objects but which yet enables the electrodes being used to be rigidly held in proper alignment for welding and to be rigidly held in precise positions for being cleaned and reconditioned.

An ancillary object of the invention is to provide one or two indexable carriers for the electrodes each of which mounts at least two electrodes and has associated with it an electrode condition device which may be applied to the electrode not in use even while the welding machine is progressing through a welding sequence.

The above and other objects and advantages of the invention will become apparent upon consideration of the following specification and the accompanying drawing wherein there is disclosed a preferred embodiment of the invention.

Figure 1:
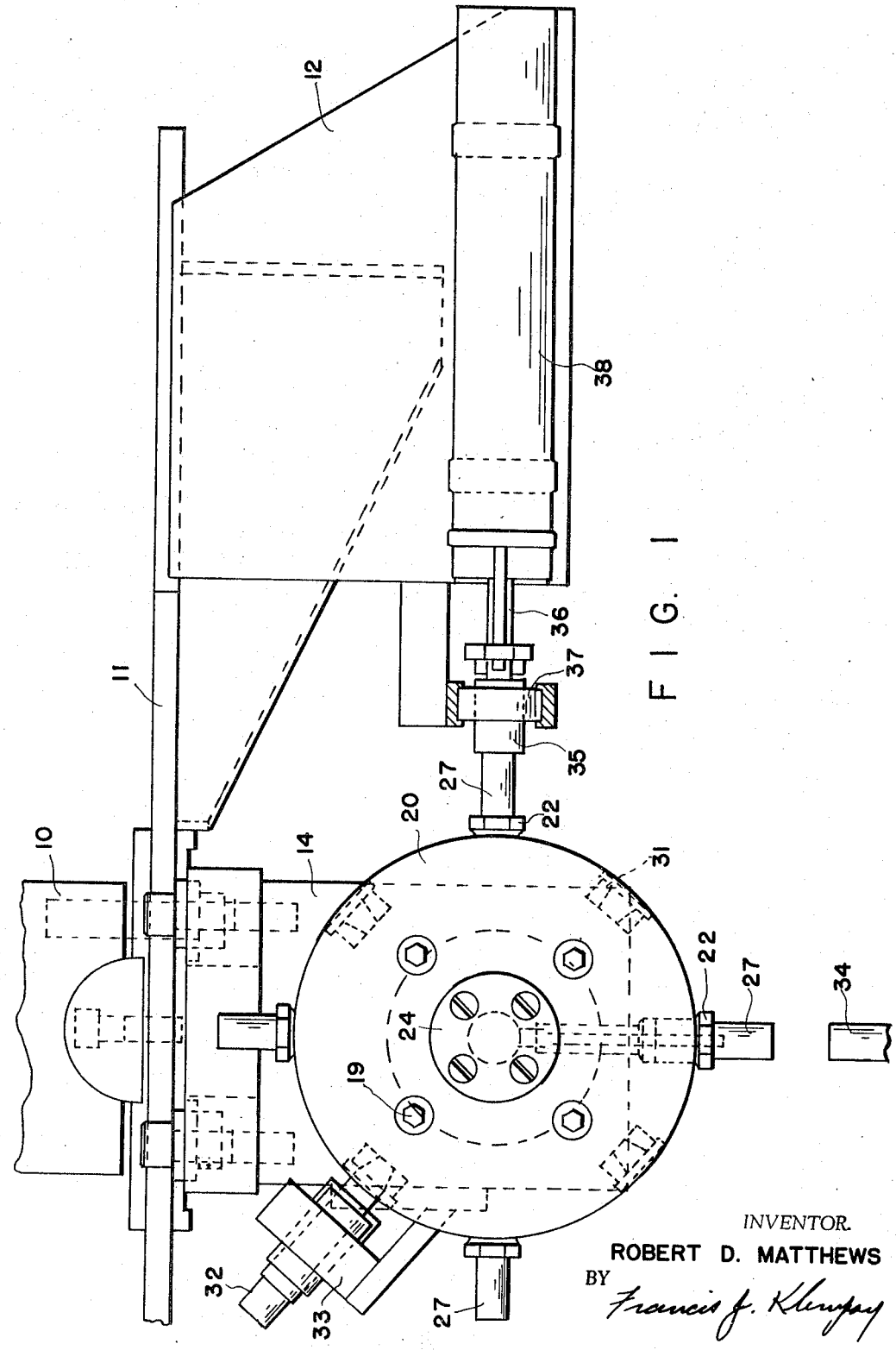
FIGURE 1 is a front elevation of a combined electrode holder and electrode cleaning device constructed in accordance with the principles of my invention.

In the drawing, reference numeral 10 depicts the lower end portion of a vertically movable quill or ram of a conventional electric resistance spot or press welder, which quill or ram is, in accordance with usual practice, suitably guided in the machine frame and commonly actuated by a double-acting air cylinder, not shown herein. Rigidly carried by the lower end of ram 10 is an arm 11 mounting a bracket 12. Also rigidly carried by the lower end of the ram 10 is a heavy copper alloy fitting 13 having a depending barrel-like portion 14 and a terminal connector 15 which is adapted to be connected to one secondary terminal of the welding transformer, not shown herein. It will be obvious that the current-conductive barrel 14 will be electrically connected to the secondary of the welding transformer.

Anti-frictionally mounted in the barrel 14 is a current-conductive spindle 16 also preferably formed of a copper alloy, and arranged to slideably contact this spindle are pressure-loaded current-conductive shoes 17 which have solid electrical connection with the metal of the barrel 14. The assembly of the parts 14, 16 and 17, as illustrated, is like the disclosure in U.S. Patent No. 2,673,333, although since the purpose of the assembly is merely to conduct the heavy welding current from terminal 15 to the anti-frictionally mounted spindle 16, various other rotary current collector designs may be used such as those shown in U.S. Patents 3,021,497 and 3,105,728, for example. In any of these devices, the spindle is separately journaled from the current-transmitting shoes or rollers and is adequately supported to take fairly heavy radial loads and to resist any longitudinal movement.

Spindle 16 is integrally formed at one end with a hub 18 to which is detachably secured as by means of the bolts 19 an annular turret head 20. In the specific embodiment illustrated, the head 20 is formed on its periphery with four equally spaced radially inward directed bores 21 to receive the electrode mounting collets 22 which may be screw threaded into the bores 21.

Figure 3:
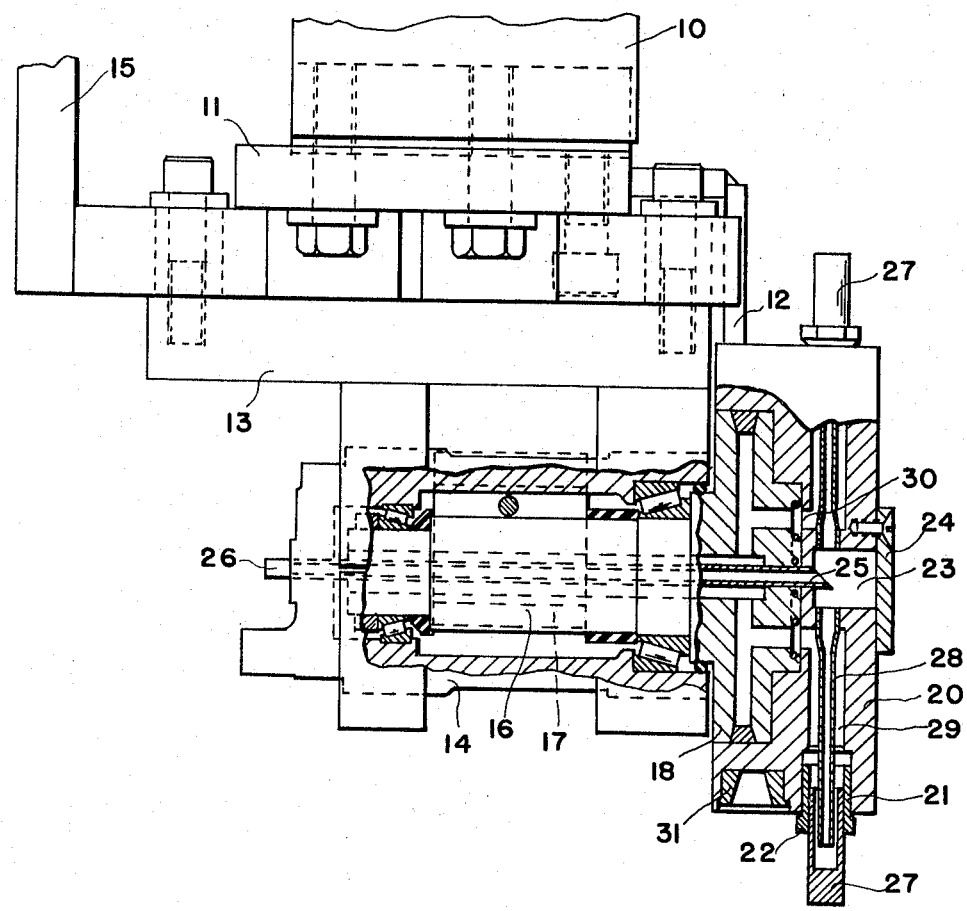
FIGURE 3 is a left side elevation, partly in section, of the assembly of FIGURE 1.

As shown in FIGURE 3, the annular turret head 20 is formed with a centrally disposed cavity 23 in its outer face covered by plate 24 and into which projects a tube 25 which extends through suitable bores to the opposite end of the spindle 16 and through the end of housing 14 where its end portion 26 may be connected to a rotary fitting whereby cooling water may be conveyed under pressure to the cavity 23. The turret head 20 is, of course, in solid contact with the hub 18 and this head, as well as the collets 22, is made of a metallic material, preferably copper alloy, so that heavy welding currents will be efficiently conducted to the electrodes held in the collets and thus also to the tips of the electrodes. These electrodes, indicated by reference numeral 27, are hollow from their inner ends, having the longitudinal section shown in FIGURE 3, to receive the outer end portions of coolant-conducting tubes 28. Tubes 28 have their inner end portions tightly received in apertures formed in the annular side wall of the cavity 23 and receive cooling fluid therefrom. The outer diameters of the radially outward portions of the tubes 28 are less than the inner diameters of the electrodes 27 to provide for fluid circulation the return circuit comprised of radial and axial bores 29 and 30, respectively, in the head 20 and of axial and radial bores formed in the hub 18 and spindle 16, all as illustrated. In accordance with the prior art represented in the abovementioned patents, the cooling fluid may discharge into the space surrounding shoes 16 and from there be discharged to a suitable drain.

It should now be understood that each of the four electrodes 27 is rigidly mounted in effective current-conducting relation on the turret head 20, that the turret head is electrically connected in an efficient manner to the transformer connection 15, and that each of the electrodes receives an adequate flow of a liquid coolant.

During normal operation of the welding machine, the electrodes 27 will be used for welding in sequence with the turret head being indexed between weld cycles in an automatic manner and at a desired frequency by specific apparatus, not inherently a part of the present disclosure and therefore not illustrated herein. However, whether the turret head 20 is automatically or manually indexed, some means must be provided to insure that the particular electrode to be used next for welding is accurately positioned with respect to the work and/or the fixed electrode of the equipment prior to closure of the electrode onto the work. I accomplish this by inserting a hardened steel tapered locating bushing 31 in the outer periphery of the turret 20 intermediate each adjacent pair of electrodes 27. The bushings 31 are arranged to be selectively engaged by a hardened taper pin 32 which is slideably received in a bracket 33 rigidly carried by the housing 14 which journals the spindle 16. A suitable biasing spring, not particularly shown but incorporated in the sliding support for the pin 32, normally holds the tapered end of the pin 32 in tight engagement with one or the other of the locating bushings 31. Pin 32 may, of course, be retracted manually to permit the indexing of the turret 20 although a suitable lever or tool, not shown, may be provided for this purpose or, alternatively, the above mentioned automatic indexing device for the turret 20 may have means to accomplish this.

In FIGURE 1, a normally fixed electrode of the welding machine is shown at 34, the term "normally fixed" being used in the sense that this electrode does not move during the making of a weld. The electrode 34 may, however, be one of a group of electrodes which is carried by an indexable turret mounted on the knee of the welding machine. Also, depending on the nature of the work the lower electrode 34 may assume a wide variety of specific shapes.

Figure 2:
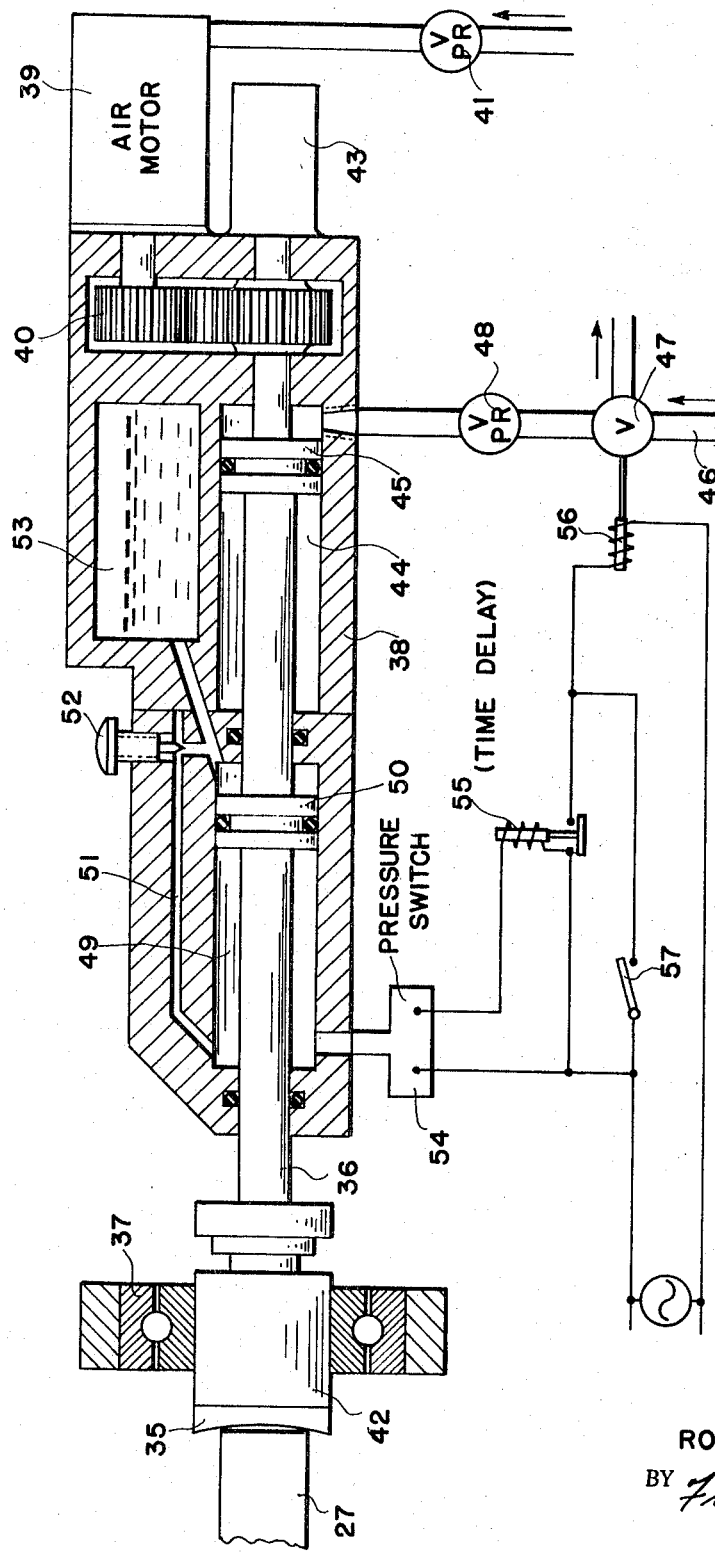
FIGURE 2 is a longitudinal section through the electrode cleaning device of FIGURE 1.

Referring now to FIGURES 1 and 2 of the drawing, the electrode cleaning and dressing assembly used comprises a properly contoured end cutter 35 which is carried by the end of a rotary shaft 36 and steadied in an antifriction bearing 37, both bearing and shaft being carried by the bracket 12 and movable up and down therewith. Shaft 36 rotates and slides longitudinally in a housing 38 which is rigidly mounted on the bracket 12. It is rotatably driven by an air motor 39 operating through gears 40, one of which is splined to the shaft, as will be understood. Air is supplied to the motor 39 under a control pressure as determined by the setting of a pressure regulating valve 41 so that it will operate at a predetermined speed.

Anticipating the precision with which it is desired to clean and dress the tips of the electrodes 27 and the high frequency with which such operations takes place when welding certain metals it is at once apparent that the cleaning and dressing tool utilized must be carefully built and accurately guided and controlled. By reference to FIGURE 1, it will be apparent that the index bushings 31 and pin 32 will accurately locate one of the connected electrodes 27 in a fixed position in each indexed position of the turret 20. The bearing 37 not only minimizes any wobbling of the cutting tool 35 but it also accurately coincides the center of the cutting tool with the adjacent electrode. To permit the cutting tool 35 to move toward and away from the end of the electrode to be conditioned, the shaft 36 is made longitudinally movable in the housing 38 and either the outer race of the bearing 37 may be slideably mounted on the bracket 12 or a shank 42 on the cutter 35 may be splined in the inner race of the bearing 37, as will be understood.

To affect the delicate and accurate work desired of the tool 35, it is obvious that this tool be moved into engagement with electrode 27 at a controlled speed and under predetermined pressure. Further, it is also required that the extent or amount of cutting at each cleaning and dressing operation be limited and that the speed of rotation of the cutter be controlled. As explained above, the latter characteristic is affected by adjustment of valve 41. Suitable spring or other retraction means, not shown, but housed in boss 43 of the housing 38 is provided to bias the shaft 36 to retracted position, whereby the cutter 35 will be outside the arcuate path of travel of the tips of the electrodes 27.

Housing 38 is formed with a first cylinder 44 having a piston 45 slideable therein, the piston 45 being fixed on the shaft 36. Air is supplied to this cylinder from a source 46 through a three-way valve 47 and a pressure regulator 48 to the side of piston 45 which will advance the cutter 35 toward the indexed electrode 27. The approach speed, as well as the rate of cutting after contact with the electrode is established, is determined and limited by the rate of transfer of hydraulic oil from one end to the other of a second cylinder 49 formed in the body member 38. As shown, a second piston 50 is affixed on the shaft 36 and slides within cylinder 49 intermediate the ends thereof. Reference numeral 51 designates passage which interconnects the opposite ends of cylinder 49, and regulating the size of this passage is a needle valve 52. An oil reservoir 53 is also formed in the housing 38 to keep the opposite ends of the cylinder 49 as well as the passage 51 continuously filled with oil.

I provide a sensitive pressure switch 54 which operates to close upon a very slight drop in pressure of the oil in the end of cylinder 49 which is adjacent the cutting tool 35. Closure of this switch operates the time delay relay 55 to hold energized the operating solenoid 56 for valve 47 whereby regulated air pressure will be held on the backside of piston 45 for a predetermined interval of time. Solenoid 56 is also wired to be initially but momentarily energized by a switch 57 which may be either manually or automatically actuated, depending on the complexity of the sequencing circuits applied to the machine. In any embodiment, the "at rest" condition of the electrode dressing assembly requires the shaft 36 to be retracted slightly to allow for a conditioned electrode to move away from the cutter 35 while the next succeeding electrode is indexed to dressing position. During this indexing, the motor 39 may be de-energized, if desired, by the use of a valve associated with its air supply, as will be understood. In any event, the motor 39 should be energized at the time air is delivered to the backside of piston 45 by energization of solenoid 56. Such energization is initially accomplished by closing switch 57. The driven cutting tool 35 is advanced toward the indexed electrode 27 at a speed determined of the setting of the needle valve 52. When contact is made with the indexed electrode, forward movement of the cutter is momentarily arrested causing a pressure drop in the oil ahead of the piston 50 which closes switch 54 and energizes the timer 55. Assuming that the switch 57 is opened before relay 55 has timed out its period, it will be obvious that the length of time the cutter 35 is in contact with the electrode 27 will be a function of the setting or selection of the relay 55. Immediately upon de-energization of the solenoid 56, the valve 47 will exhaust the cylinder 44 and permit the shaft 36 to be retracted, all in preparation for the next succeeding cycle of operation.

It should be observed that since the cutting tool and its operating and connected parts are all carried by the bracket 11, 12, there will be no electrical potential between the indexed electrodes 27 and the cutting tool to cause sparking between the electrode and tool during the dressing operation. Also, since the tool 35 moves up and down with the turret 20, an electrode can be depressed during the "off" time of the welder when the quill 10 is retracted and work is being indexed in the throat of the welding machine. Using the essentials herein disclosed, it is readily possible to provide a fully automated and high speed welding machine which will present accurately conditioned electrodes to the work and successive cycles of operation. Using four electrodes, for example, in each turret, it will be obvious that a rather lengthy period of operation may be enjoyed before the necessity arises for changing of the electrodes.

By proper sequencing and control of the air pressures supplied to the cutting tool as well as by properly setting the needle valve 52 and by properly setting or selecting the time delay 55, it is possible to regulate very closely the minimum amount of work done on the electrodes to maintain them in clean, bright, and accurately contoured condition. The system is operative, regardless of variations in the lengths of the electrodes, thereby making it unnecessary to compensate for variations in wear, and thereby facilitating the replacement of the electrodes.

Having thus described my invention, what I claim is:

1. In an electric resistance spot welding machine having a current-conductive support guided for movement toward and away from the work, a current-conductive turret journaled on said support in current-conductive relation therewith and mounting on its outer periphery a plurality of spot welding electrodes adapted to be brought into selective contact with the work upon indexing movement of said turrent and movement of said support toward said work tapered, indexing bushings at spaced intervals on said turret and a correspondingly tapered retractable index pin carried by said support to selectively enter one of said bushings whereby said turret may be locked in one or the other of its operative welding positions, and means rigidly carried with said support to clean and dress the tip of one of said electrodes while another of said electrodes is in welding position.

2. In an electric resistance spot welding machine having a current-conductive support guided for movement toward and away from the work, a current-conductive turret journaled on said support in current-conductive relation therewith and mounting on its outer periphery a plurality of spot welding electrodes adapted to be brought into selective contact with the work upon indexing movement of said turret and movement of said support toward said work, a rotatable cleaning and dressing tool mounted for rotation about an axis fixed with respect to the axis of rotation of the turret and adapted to be moved in contact with the tip of one of said electrodes which is not in welding position when said turret is in one of its indexed positions, a fluid pressure actuated piston connected to said tool and operable in a stationarily mounted cylinder, a motor for rotating said piston, fluid flow control means to control the rate of advance of said piston and tool toward the adjacent electrode tip, fluid pressure control means to control the force exerted by said piston and tool on said electrode tip, fluid pressure responsive sensing means to sense the first contact of said cutter with said tip, and timing means initiated by said sensing means to time the time duration of exertion of a predetermined pressure on said piston and a predetermined cutting contact time between said tool and electrode tip.

References Cited by the Examiner
UNITED STATES PATENTS

| | | | |
|---|---|---|---|
| 1,999,617 | 4/1935 | Randall | 219—103 |
| 2,154,243 | 4/1939 | Langhans | 219—103 |
| 2,357,038 | 8/1944 | Whitesell | 219—86 |
| 2,419,817 | 4/1947 | Bruno | 219—86 |
| 2,529,634 | 11/1950 | Sciaky | 219—84 |

RICHARD M. WOOD, *Primary Examiner.*

B. A. STEIN, *Assistant Examiner.*